April 22, 1958     R. F. HEISER     2,831,960
VEHICLE LIGHT
Filed Dec. 27, 1956

Robert F. Heiser
INVENTOR.

BY *Clarence A. O'Brien*
*and Harvey B. Jacobson*
Attorneys

United States Patent Office 2,831,960
Patented Apr. 22, 1958

2,831,960

VEHICLE LIGHT

Robert F. Heiser, Valparaiso, Fla.

Application December 27, 1956, Serial No. 630,785

1 Claim. (Cl. 240—7.1)

This invention relates to vehicle lighting and more particularly to a novel arrangement of an exteriorly mounted vehicle light to provide for adequate illumination for motorists at night especially during the hazardous approach and passing periods of vehicles and for city driving to eliminate all glare from headlamp reflectors.

The primary object of the present invention resides in the provision of a lighting arrangement which will reduce glare of reflected lights in the eyes of an approaching motorist while directing a spot beam of light ahead of the driven vehicle at an adjustable distance in front of the vehicle.

A further object of the invention resides in the provision of colored illumination of the area about a vehicle provided by a novel hollow member of truncated conical shape which is of a colored light transmitting material. Thus, when the vehicle is viewed from any angle at night, the direction in which the vehicle is travelling can be readily ascertained from the shape of the device mounted on the vehicle.

Still further objects and features of this invention reside in the provision of vehicle lighting arrangements that are simple in construction, easy to install on various makes and models of existing as well as future designs of vehicles, and which are adapted to be installed in any suitable location on the vehicle while employing novel means for directing and adjusting the path of light beams emanating therefrom.

A still further object resides in the provision of a colored, hollow secondary lens for a vehicle with a "spot" type light for cutting out the reflected light from lamps when used in fog. Thus seeing for greater distances is made possible. Furthermore the invention is adapted for use on boats of the cruiser type, and when so used, the regular spot light is made more effective because the "stray" light is not permitted to "bounce" off decks back to the operator's eyes.

These, together with the various ancillary objects and features of the invention which will become apparent as the following description proceeds, are attained by this exteriorly mounted vehicle lighting arrangement, a preferred embodiment of which has been illustrated in the accompanying drawings, by way of example only, wherein.

Figure 1:
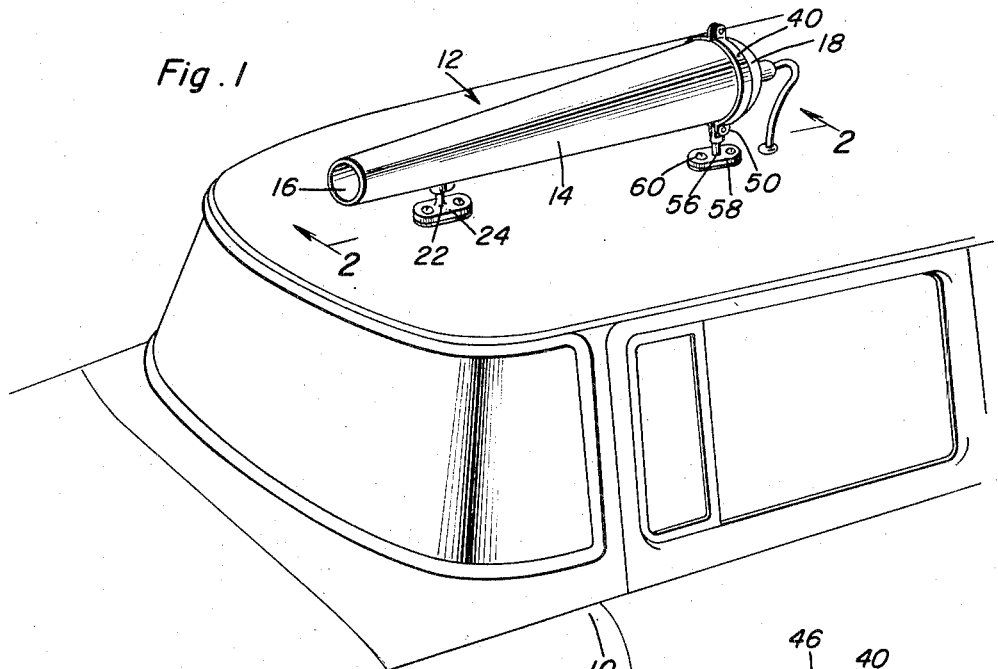
Figure 1 is a perspective view showing an exteriorly mounted vehicle lighting arrangement constructed in accordance with the concepts of the present invention.
Figure 2:
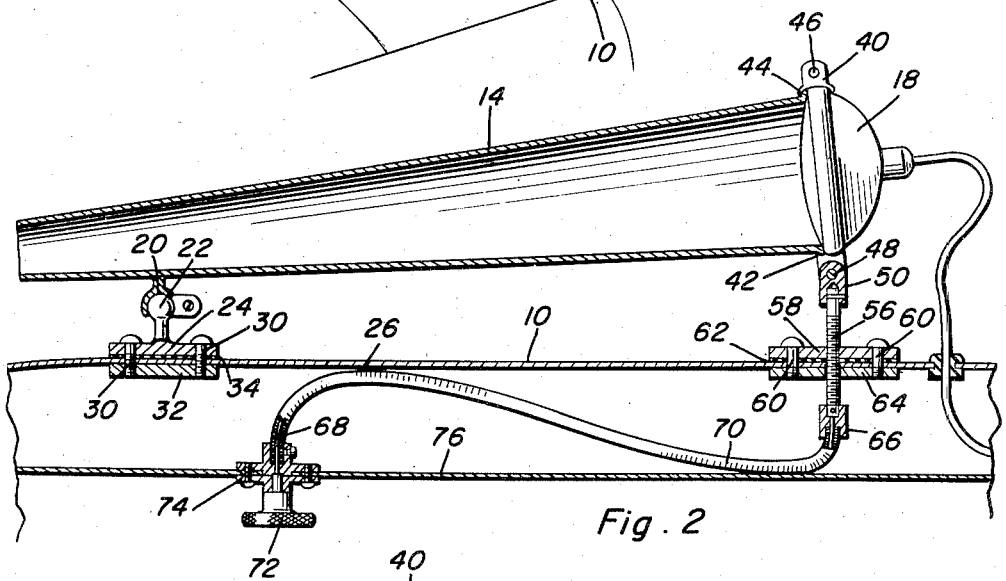
Figure 2 is an enlarged vertical sectional detail view taken on the plane of line 2—2 of Figure 1.
Figure 3:
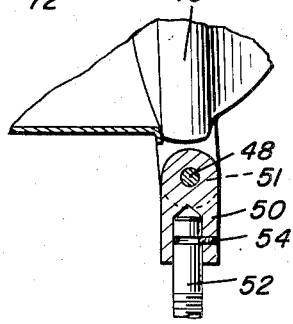
Figure 3 is an enlarged sectional detail view illustrating particularly the construction of the rod and clamp means used for adjusting the lamp and associated hollow truncated conical member.

With continuing reference to the accompanying drawing wherein like reference numerals designate similar parts throughout the various views, reference numeral 10 generally designates a vehicle of any suitable construction on which the vehicle lighting arrangement indicated at 12 is adapted to be installed. This vehicle lighting device 12 consists of an elongated member 14 which is of a truncated conical shape and which is hollow having an aperture or opening 16 remote from the hollow end at which there is secured a lamp 18. The lamp 18 may be of a conventional "sealed beam" construction with a converging lens or an elliptical, parabolic reflector with a focal length equal to the length of the secondary lens 14. Thus the major light beam is concentrated through the aperture 16 and passes with full intensity to the roadway ahead.

The truncated conical member 14 is preferably formed of a suitable colored and light transmitting material such as a synthetic plastic. This material may be polystyrene, polyethylene, or may be formed from any other suitable synthetic resin or the like or reinforced with suitable fibers for strength. Because of the construction of the hollow member 14, a portion of the light emitted by the lamp 18 will pass through the light transmitting walls of the member 14. This light assists in identification and location of the vehicle on which the vehicle lighting system is mounted and enables a person to ascertain the direction of travel of the vehicle by the convention of having the narrower end of the vehicle lighting arrangement directed forwardly as well as having a third dimension and color to aid in judging distances.

Secured to the member 14 is a clamp-like socket 20 for engagement with a spherical member 22 carried by a bracket 24 secured to the top 26 or other portion of the vehicle 10. The bracket is secured to the top 26 of the vehicle 10 by suitable fasteners as at 30 which are threadedly engaged in a member 32 beneath the top 10. A gasket 34 may be provided as is desired.

The ball and socket joint at the front end of the member 14 thus provides a universal mounting for the member 14. Clampingly secured about the sealed beam headlight 18 is a clamping arrangement 40 which is used to adjust and support the lamp 18. The member 14 may be provided with a peripheral flange as at 42 and it is noted that the clamping member may be flanged as at 44 so as to engage the flange 42 and thus the clamping arrangement 40 may function to not only clampingly engage the lamp 18 but to also hold the member 14 to the lamp 18. A lower threaded fastener 46 may be used to clampingly affix the upper ends of the clamping elements 40 about the lamp 18 and the member 14, the lower end of the clamping arrangement 40 being pinned as at 48 and carrying a pivotally mounted fitting 50 having a rod 52 rotatably keyed thereto by means of a key 54. The pin 48 is adapted to extend through a suitable opening in the fitting 50 and through suitable slots as at 51 in the clamping elements 40 so as to permit pivotal motion of the fitting 50 with respect to the clamping arrangement 40. The rod 52 is threaded as at 56 and extends through a threaded bracket 58 held by means of fasteners 60 to the top 26 of the vehicle 10. A gasket 62 may be provided as desired and the fasteners 60 are threadedly secured in an underplate 64. Secured to the rod 52 by couplings 66 is a flexible cable 68 having a housing 70. The flexible cable 68 is adapted to be rotated by a knob 72 which is suitably mounted by means of a bracket 74 or the like on the ceiling or headliner if formed of a rigid material as at 76 of the vehicle.

Utilizing the device 12, it will be noted that an auxiliary illuminating source can be provided which can be adjusted readily and the ball and socket joint formed at the front end of the member 14 will support the illuminating device during the adjustment. By rotation of the knob 72, the lamp 18 can be raised or lowered thus directing the light emitted by the lamp 18 to a point more or less in front of the vehicle. The adjustment may be required to set the lamp for different weights carried in the vehicle. The adjustment helps the operator set the "spot of light" at a distance in front of the vehicle which is desirable for him to see such as 275-300 feet in front of the vehicle. When this unit 12 is mounted between the front wheels (directed forward) this adjustment is less critical. Then the movement is changed to a lateral one and movement may be accomplished by the steering mechanism.

It is to be noted that this application is a continuation-in-part of application of Robert F. Heiser, Serial No. 438,673, now Patent No. 2,784,303 which was filed on June 23, 1954, and which was issued March 5, 1957, for Vehicle Lighting.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A vehicle lighting arrangement comprising an elongated hollow member of truncated conical shape arranged in a forwardly converging direction on a vehicle, a universal fitting supporting the forward end of said member on the vehicle, a lamp secured to the rear end of said member, and means secured to said lamp adjustably mounting said lamp and hence said member on said vehicle, said hollow member being of a colored light transmitting material, said means including a clamp secured to said lamp, a bracket secured to the vehicle, a rod threadedly secured in said bracket and engaging said clamp, a flexible cable secured to said rod, and means secured to said flexible cable for rotating said flexible cable and said rod to adjust said lamp and said hollow member.

References Cited in the file of this patent

UNITED STATES PATENTS

| 291,199 | Kasschau | Jan. 1, 1884 |
| 1,540,476 | Hoffman et al. | June 2, 1925 |
| 1,580,515 | McCallum | Apr. 13, 1926 |
| 1,584,292 | Rogers | Feb. 5, 1952 |
| 2,734,997 | Frady | Feb. 14, 1956 |